US012145742B2

(12) United States Patent
Biskup et al.

(10) Patent No.: US 12,145,742 B2
(45) Date of Patent: Nov. 19, 2024

(54) GUIDE SYSTEMS FOR INSTALLING AIRCRAFT STRUCTURES

(71) Applicant: The Boeing Company, Chicago, IL (US)

(72) Inventors: Bruce Allen Biskup, Everett, WA (US); James Tane Iwamoto, Rento, WA (US); Richard Kevin Wilson, Mukilteo, WA (US); Robert Steven Wright, Seattle, WA (US); August W. McKenna, Everett, WA (US); Jack W. Mauldin, Mill Creek, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/709,050

(22) Filed: Mar. 30, 2022

(65) Prior Publication Data

US 2022/0315241 A1   Oct. 6, 2022

Related U.S. Application Data (60) Provisional application No. 63/168,806, filed on Mar. 31, 2021.

(51) Int. Cl.
  *B64D 45/04*   (2006.01)
  *B60T 8/17*    (2006.01)
  *B64C 25/42*   (2006.01)

(52) U.S. Cl.
  CPC ............ *B64D 45/04* (2013.01); *B60T 8/1703* (2013.01); *B64C 25/426* (2013.01); *B60T 2210/12* (2013.01)

(58) Field of Classification Search
  CPC . F02K 1/80; F02K 1/70; F01D 25/285; B64F 5/10; B64F 5/50; B64D 29/06
  See application file for complete search history.

(56) References Cited

U.S. PATENT DOCUMENTS 2,564,530 A   8/1951   Maurice
5,203,525 A   4/1993   Remlaoui
(Continued)

FOREIGN PATENT DOCUMENTS

EP   2399827        12/2011
EP   3696095 A1 *   8/2020   ............. B64D 27/18
(Continued)

OTHER PUBLICATIONS

European Patent Office, "Extended European Search Report", issued in connection with European Patent Application No. 22157732.3 on Aug. 5, 2022, 7 pages.
(Continued)

*Primary Examiner* — Craig Kim
(74) *Attorney, Agent, or Firm* — Hanley, Flight & Zimmerman, LLC (57) ABSTRACT

Guide systems for installing aircraft structures are disclosed. An example apparatus includes a first guide system structured to removably couple to a first aircraft structure having a first hinge component. A second guide system is structured to removably couple to a second aircraft structure having a second hinge component. The first guide system is to engage the second guide system to enable alignment between the first hinge component and the second hinge component during assembly of the first aircraft structure and the second aircraft structure.

24 Claims, 10 Drawing Sheets

(56) References Cited

U.S. PATENT DOCUMENTS

| | | | |
|---|---|---|---|
| 6,189,832 B1 | 2/2001 | Jackson | |
| 6,604,355 B1 | 8/2003 | Sternberger | |
| 2004/0118970 A1 | 6/2004 | Muylaert et al. | |
| 2007/0226981 A1 | 10/2007 | Craig | |
| 2011/0318173 A1 | 12/2011 | Ramlaoui | |
| 2012/0151724 A1 | 6/2012 | Defrance et al. | |
| 2013/0220435 A1* | 8/2013 | James | B64D 29/08 137/15.1 |
| 2015/0044011 A1 | 2/2015 | Matulewicz et al. | |
| 2016/0167789 A1* | 6/2016 | Knight | B64D 31/14 454/71 |
| 2016/0167808 A1 | 6/2016 | Iliopoulos | |
| 2016/0363323 A1 | 12/2016 | Mogle et al. | |
| 2016/0376015 A1* | 12/2016 | Lacko | B64D 27/40 29/888.012 |
| 2018/0163631 A1* | 6/2018 | Takeuchi | B64C 7/00 |
| 2018/0346138 A1* | 12/2018 | Ridray | B64D 27/40 |
| 2018/0362172 A1* | 12/2018 | Paolini | B64D 27/40 |
| 2018/0362174 A1* | 12/2018 | Paolini | B64D 27/16 |
| 2019/0284856 A1* | 9/2019 | Geliot | B64D 29/08 |
| 2019/0359342 A1* | 11/2019 | Cooper | F02C 7/20 |
| 2020/0079516 A1 | 3/2020 | Gaches et al. | |
| 2020/0140105 A1* | 5/2020 | Pretty | F02C 7/00 |
| 2020/0182194 A1* | 6/2020 | Journade | B64D 29/06 |
| 2020/0325797 A1 | 10/2020 | Wright et al. | |
| 2021/0079871 A1 | 3/2021 | Grall et al. | |
| 2021/0222648 A1* | 7/2021 | Cazeaux | F02K 1/80 |
| 2021/0310441 A1* | 10/2021 | Palanisamy | F02K 1/763 |
| 2021/0316872 A1 | 10/2021 | Lacko | |
| 2022/0073215 A1 | 3/2022 | Le Gall | |
| 2022/0315234 A1* | 10/2022 | Torjesen | F02C 7/20 |
| 2023/0255803 A1* | 8/2023 | Kuniholm | A61F 2/5046 623/57 |
| 2023/0286661 A1 | 9/2023 | Klingels | |

FOREIGN PATENT DOCUMENTS

| | | | |
|---|---|---|---|
| EP | 3798133 A1 * | 3/2021 | B64D 29/06 |
| EP | 3805108 A1 * | 4/2021 | B64D 29/06 |
| FR | 3064980 A1 * | 10/2018 | B64D 29/06 |
| WO | 2007109200 | 9/2007 | |
| WO | 2015015262 | 2/2015 | |
| WO | WO-2019129961 A1 * | 7/2019 | B64D 29/06 |
| WO | WO-2022028653 A1 * | 2/2022 | B64D 27/18 |

OTHER PUBLICATIONS

United States Patent and Trademark Office, "Requirement for Restriction / Election," issued in connection with U.S. Appl. No. 17/707,647, dated Aug. 10, 2023, 7 Pages.

United States Patent and Trademark Office, "Non-Final Office Action," issued in connection with U.S. Appl. No. 17/707,647, dated Oct. 20, 2023, 15 Pages.

United States Patent and Trademark Office, "Final Office Action," issued in connection with U.S. Appl. No. 17/707,647, dated Mar. 15, 2024, 14 pages.

United States Patent and Trademark Office, "Advisory Action," issued in connection with U.S. Appl. No. 17/707,647, dated May 10, 2024, 5 pages.

United States Patent and Trademark Office, "Notice of Allowance and Fee(s) Due," issued in connection with U.S. Appl. No. 17/707,647, dated Sep. 9, 2024, 8 pages.

* cited by examiner

GUIDE SYSTEMS FOR INSTALLING AIRCRAFT STRUCTURES

CROSS-REFERENCE TO RELATED APPLICATIONS

This patent claims the benefit of U.S. Provisional Patent Application No. 63/168,806 filed Mar. 31, 2021. U.S. Provisional Patent Application No. 63/168,806 is hereby incorporated herein by reference in its entirety. Priority to U.S. Provisional Patent Application No. 63/168,806 is hereby claimed.

FIELD

The present disclosure relates generally to aircraft and, more particularly, to guides for installing aircraft structures.

BACKGROUND

Aircraft engines often employ reverse thruster systems to produce a reverse thrust to help decelerate the aircraft upon landing (e.g., after touchdown), thereby reducing brake wear and enabling shorter landing distances.

SUMMARY

An example apparatus includes a first guide system structured to removably couple to a first aircraft structure having a first hinge component. A second guide system is structured to removably couple to a second aircraft structure having a second hinge component. The first guide system is to engage the second guide system to enable alignment between the first hinge component and the second hinge component during assembly of the first aircraft structure and the second aircraft structure.

Another apparatus includes a first guide removably attachable to a first hinge component and a second hinge component of a pylon of an aircraft engine, a second guide removably attachable to a third hinge component of a thrust reverser of the aircraft engine; and a third guide removably attachable to a fourth hinge component of the thrust reverser. The second guide is spaced from the third guide. The second guide to engage the first guide to align the first hinge component and the third hinge component, and the third guide to engage the first guide to align the second hinge component and the fourth hinge component when installing the thrust reverser to the pylon.

An example method includes: removably coupling a first guide to a first structure; removably coupling a second guide to a second structure; coupling the first guide and the second guide; moving the second structure toward the first structure; attaching a hinge pin to the couple the first structure and the second structure; and removing the first guide from the first structure and the second guide from the second structure.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Some turbofan engines employ reverse thrust mechanisms to decelerate an aircraft upon landing. The reverse thrust produced reduces the forward thrust produced by the turbofan engine and, thus, reduces the speed of the aircraft. For example, reverse thrust is produced by redirecting airflow within the engine that would otherwise produce forward thrust. Thrust reversers typically include a clamshell profile. For example, the thrust reversers include a first thrust reverser portion or section (e.g., a right-side wall) and a second thrust reverser portion or section (e.g., a left-side wall) that surround an engine core when an aircraft engine is assembled. Typically, the thrust reverser portions attach to a pylon structure of an aircraft via a hinge pin connection.

Thrust reverser installation can be ergonomically challenging and require safety protocols. For example, to couple the thrust reverser sections to the pylon, the thrust reverser sections are positioned relative to the pylon via a lift system (e.g., a crane, a ground lift, etc.). The thrust reverser sections are maneuvered and/or guided relative to the pylon to align hinge apertures of the pylon and thrust reverser sections via a crane (e.g., an overhead crane). With the hinge apertures positioned in alignment, personnel or technicians climb on top of the aircraft engine using fall protection safety equipment to install the hinge pins while laying across the top of the aircraft engine and while the thrust reverser section is supported by the crane. This assembly technique is not ergonomic. For example, a technician typically lays across a top of the aircraft engine and extend their hand in an area that has limited access to install the pins. Additionally, the thrust reverser load is supported by the crane, which can shift or sway during assembly and increase manufacturing complexity.

Example guide systems disclosed herein facilitate installation of thrust reversers. Specifically, the guide systems disclosed herein are ergonomic. For example, the guide systems disclosed herein enable a first structure or thrust reverser to be securely attached to a second structure or pylon without the need for a technician to climb on and/or lay across the aircraft engine. Additionally, the guide systems disclosed herein remove dependency of a crane to support a load of the thrust reverser when installing hinge pins. The load of the thrust reverser is supported by the pylon via the guide system, thereby eliminating potential for shifting or swaying during installation of the hinge pins. For example, the guide systems disclosed herein employ a brace system on an interfacing pylon hinge that can safely support the weight of the thrust reverser and orient the thrust reverser in a manner that enables installation of the thrust reverser/pylon hinge pins after the crane is removed. As a result, the guide systems disclosed herein greatly improve manufacturability. Thus, the example guides disclosed herein reduce manufacturing complexity and/or improve manufacturing efficiency.

Example guide systems disclosed herein can be employed to couple or attached a first aircraft structure and a second aircraft structure. For example, a first aircraft structure can include a pylon, an aircraft frame structure, a wingbox and/or any other aircraft structure. A second aircraft structure can include a thrust reverser portion, a fan cowl, and/or any other portions of a nacelle and/or any other aircraft structure. Although examples described below are directed to a first aircraft structure as a pylon and a second aircraft structure as a thrust reverser portion, the example guide systems disclosed herein can be employed to attach a fan cowl to a pylon. In some examples, example guide systems disclosed herein can be employed to any other first aircraft structure and a second aircraft structure of an aircraft forming a hinged connection. In some examples, the guide systems disclosed herein can be employed with other vehicles, marine vehicles, frame structures, machines, equipment, buildings, etc., For example, the guide systems disclosed herein can be employed to facilitate and/or enable coupling of two or more structures that couple together via a hinged connection.

Figure 1:
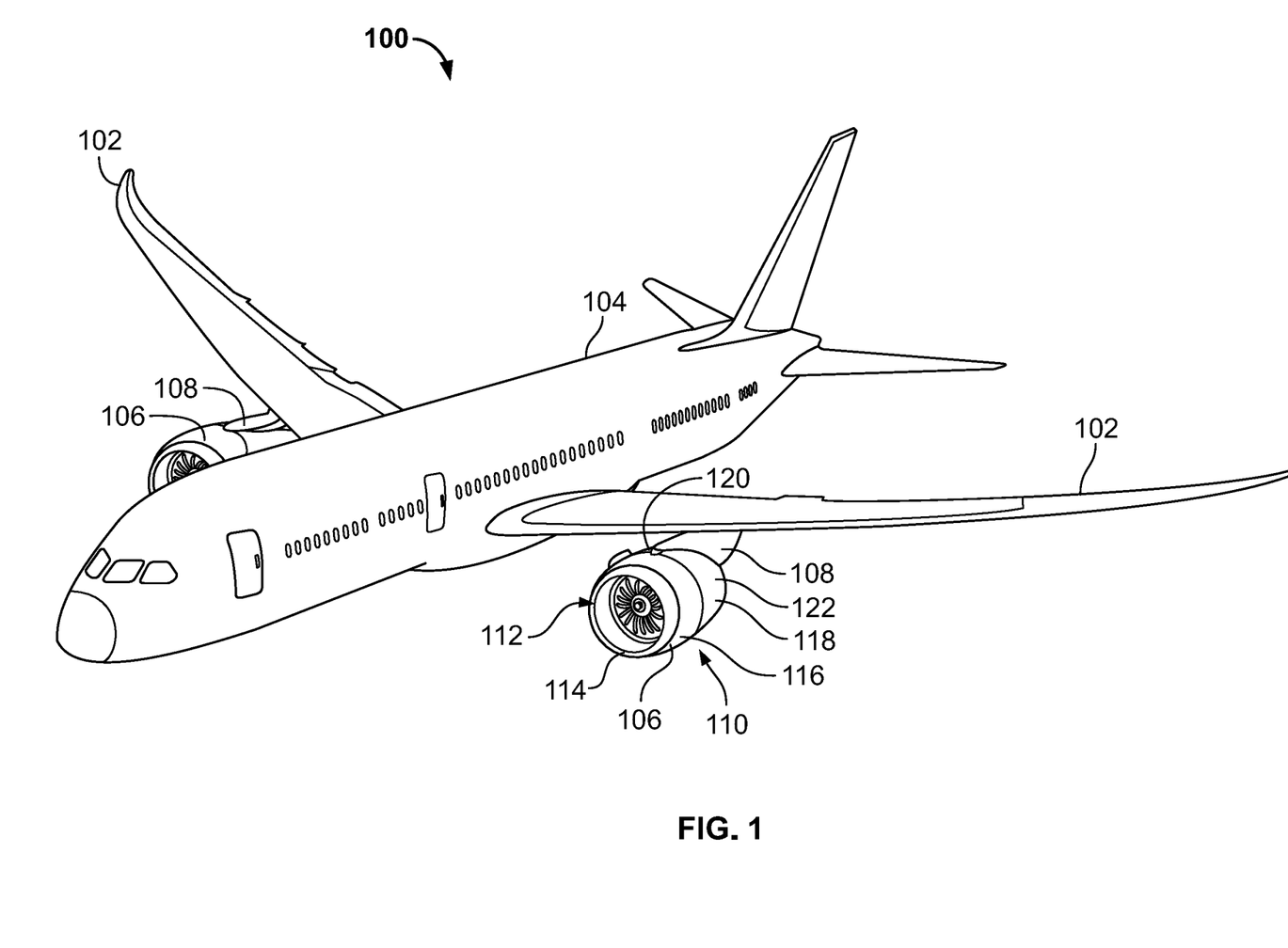
FIG. 1 is a perspective view of an example aircraft in which aspects of the present disclosure may be implemented.

FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. Each aircraft engine 106 of the illustrated example is a turbofan engine that may embody aspects of the teachings of this disclosure. The aircraft engine 106 of FIG. 1 includes a nacelle 110 that houses an engine core 112 and provides an aerodynamic outer surface to reduce drag. The nacelle 110 includes an inlet cowl 114 (e.g., an outer panel), a fan cowl 116 (e.g., a clam-shell cowl), and a thrust reverser 118. The fan cowl 116 and the thrust reverser 118 encompass or surround the engine core 112. The thrust reverser 118 of the illustrated example forms or defines a portion of an outer surface of the nacelle 110. The thrust reverser 118 of the illustrated example includes a first thrust reverser portion 120 (e.g., a right-hand thrust reverser wall or first half) and a second thrust reverser portion 122 (e.g., a left-hand thrust reverser wall or second half). As described in greater detail below, the thrust reverser 118 is coupled to the pylon 108 in accordance with the teachings disclosed herein. Additionally, the thrust reverser 118 is movably coupled (e.g. pivotally coupled) to the pylon 108 to allow access to the engine core 112 during maintenance. Although the aircraft 100 of FIG. 1 is a commercial aircraft (e.g., a commercial airliner), the examples disclosed herein can be employed with military aircraft, marine vehicles, all-terrain vehicles, etc.

Figure 2:
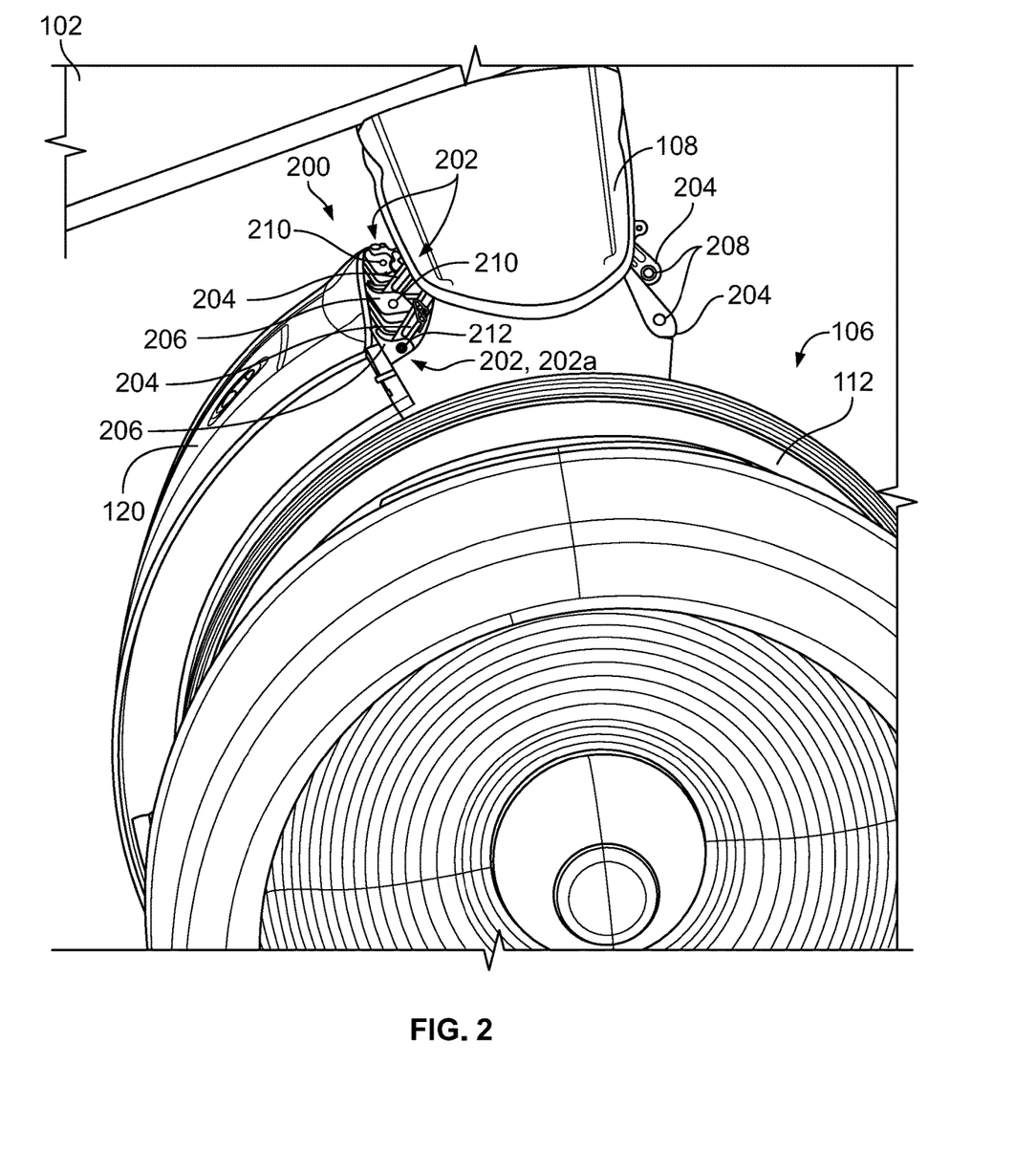
FIG. 2 is a front, partial perspective view of an example aircraft engine of the example aircraft of FIG. 1.

FIG. 2 is a partial, perspective view of the aircraft 100 of FIG. 1. The aircraft engine 106 of FIG. 2 is shown with exterior components removed such as, for example, the second thrust reverser portion 122 (FIG. 1), the fan cowl 116 (FIG. 1), and other portions of the nacelle 110 (FIG. 1), to show substructure of the aircraft engine 106. As noted in FIG. 1, the aircraft engine 106 (e.g., the engine core 112, the nacelle 110, the thrust reverser 118, the fan cowl 116, etc.) is coupled to the wing 102 via the pylon 108. The first thrust reverser portion 120 is shown coupled to the pylon 108 in FIG. 2. The second thrust reverser portion 122 is removed for clarity. The second thrust reverser portion 122 is similar to (e.g., is a mirror image of) the first thrust reverser portion 120.

To couple the thrust reverser 118 to the pylon 108, the thrust reverser 118 and the pylon 108 forms a hinge 200 (e.g., a pinned lug-and-clevis connection). The hinge 200 of the illustrated example includes a plurality of hinge joints 202 (e.g., lug-and-clevis joints). For example, the pylon 108 includes a plurality of first hinge components 204 and the thrust reverser portion 120 includes a plurality of second hinge components 206. The first hinge components 204 receive or couple to respective ones of the second hinge components 206 to form the hinge joints 202. Each of the first hinge components 204 includes a hinge opening 208 and each of the second hinge components 206 includes a hinge opening 210. Each of the hinge joints 202 receives a hinge pin 212. Only a first hinge joint 202a of FIG. 2 is shown with the hinge pin 212. The hinge pins of the other hinge joints 202 are omitted for clarity. In some examples, the hinge joint 202 is a lug-and-clevis joint. To form the lug-and-clevis type hinge joints 202, the first hinge components 204 of the pylon 108 of the illustrated example are lugs and the second hinge components 206 of the thrust reverser portion 120 of the illustrated example are devises. In some examples, the thrust reverser portion 120 can include the lugs and the pylon 108 can include the devises. In some examples, other structures can be employed to define the hinge joints 202 and/or the hinge 200.

Figure 3:
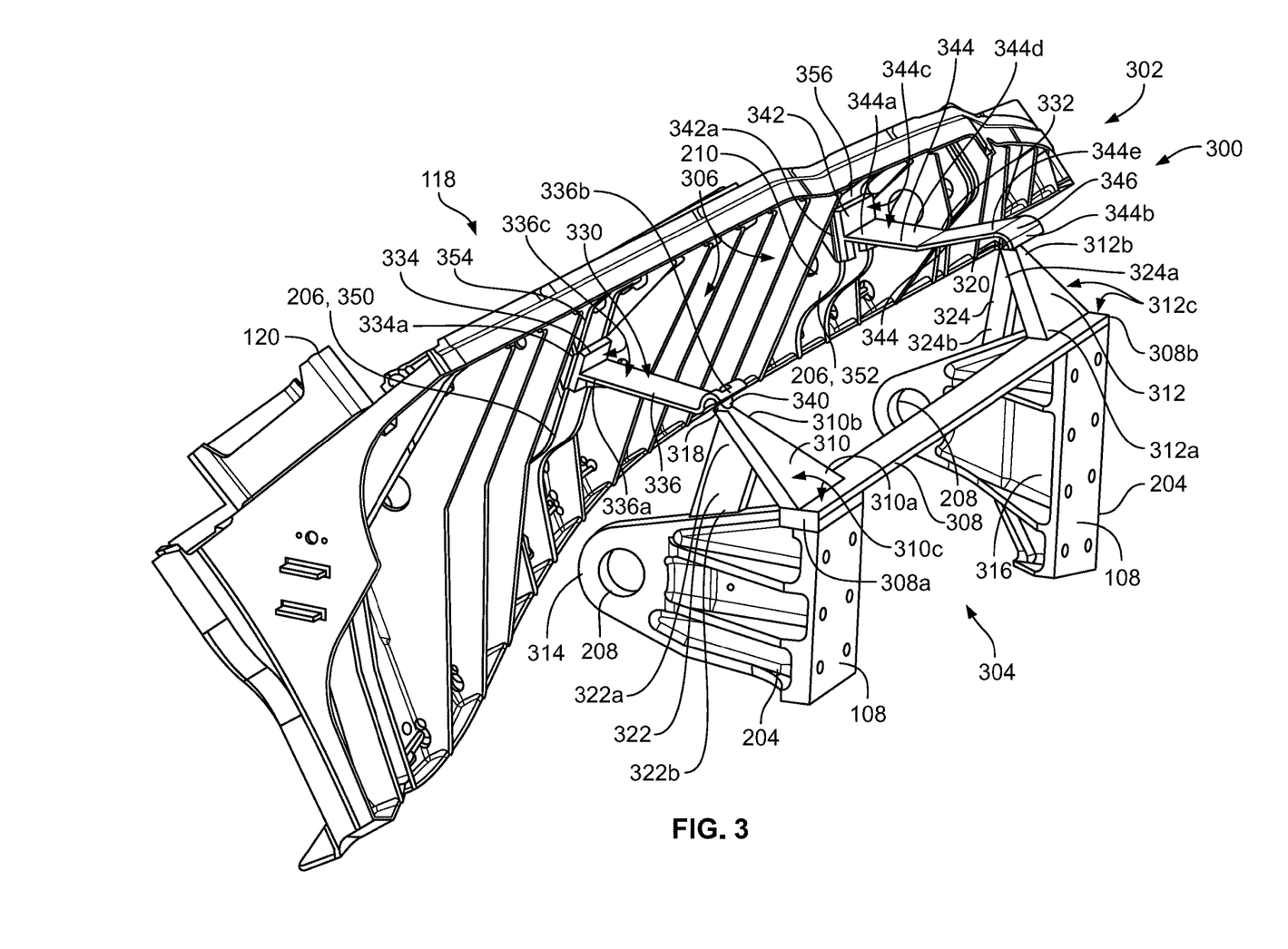
FIG. 3 is a perspective view of an example guide system constructed in accordance with the teachings of this disclosure implemented with the example aircraft engine of FIGS. 1-3. The guide system of FIG. 3 is shown in a first position.

FIG. 3 is a perspective view of an example guide system 300 constructed in accordance with the teachings of this disclosure. The guide system 300 of FIG. 3 is shown in a first position 302 (e.g., an installation position or angle). The guide system 300 facilitates alignment between the thrust reverser 118 and the pylon 108. Specifically, the guide system 300 facilitates alignment between the hinge openings 208 of the first hinge components 204 and the hinge openings 210 of the second hinge components 206 when the thrust reverser portion 120 couples to the pylon 108.

The guide system 300 of the illustrated example includes a first guide system 304 (e.g., a first installation tool) and a second guide system 306 (e.g., a second installation tool). The first guide system 304 is removably coupled to the pylon 108 (e.g., a first aircraft structure), which includes or supports the first hinge components 204. The first guide system 304 includes a body 308, a first leg 310 and a second leg 312. The body 308 is a beam having a first end 308a and a second end 308b. In the illustrated example, the body 308 has a length that spans across a first one 314 of the first hinge components 204 and a second one 316 of the first hinge components 204 of the pylon 108. Specifically, the first end 308a of the body 308 is removably coupled to the first one 314 of the first hinge components 204 and the second end 308b of the body 308 is coupled to the second one 316 of the first hinge components 204. For example, the body 308 can be removably coupled to the pylon 108 via bolts, clamps, and/or another fastener(s).

The first leg 310 of the illustrated example is spaced from the second leg 312 by a distance that is approximately equal to the length of the body 308. The first leg 310 has a first leg end 310a and a second leg end 310b. The first leg end 310a is attached to the body 308 and the second leg end 310b projects in a direction away from the body 308. In this example, the first leg 310 projects from the body 308 at a first leg angle 310c. The second leg 312 has a third leg end 312a and a fourth leg end 312b. The third leg end 312a is attached to the body 308 and the fourth leg end 312b projects in a direction away from the body 308. In this example, the second leg 312 projects from the body 308 at a second leg angle 312c. The first leg angle 310c of the illustrated example is different from the second leg angle 312c. However, in some examples, the first leg angle 310c is substantially equal or identical to the second leg angle 312c. The first leg 310 includes a first leg connector 318 at the second leg end 310b and the second leg 312 includes a second leg connector 320 at the fourth leg end 312b.

The first guide system 304 also includes a first brace 322 to support the first leg 310 and a second brace 324 to support the second leg 312. The first brace 322 is coupled to the first leg 310 and projects in a direction away from the first leg 310. The first brace 322 has a first brace end 322a and a second brace end 322b opposite the first brace end 322a. The first brace end 322a is attached to the second leg end 310b of the first leg 310 and the second brace end 322b is removably coupled to the pylon 108 (e.g., the first one 314 of the first hinge components 204). The first brace end 322a projects from the second leg end 310b towards the pylon 108. Similarly, the second brace 324 is coupled to the second leg 312 and projects in a direction away from the second leg 312. The second brace 324 has a third brace end 324a attached to the fourth leg end 312b and a fourth brace end 324b that removably couples to the pylon 108 (e.g., the second one 316 of the second hinge components 206).

The first leg 310 and the second leg 312 are fixed to the body 308. Additionally, the first brace 322 and the second brace 324 are fixed to the first leg 310 and the second leg 312, respectively. For example, the first leg end 310a is rigidly coupled (e.g., fixed) to the body 308 and the second leg end 310b is rigidly coupled (e.g., fixed) to the first brace end 322a. Similarly, the third leg end 312a is rigidly coupled (e.g., fixed) to the body 308 and the fourth leg end 312b is rigidly coupled (e.g., fixed) to the third brace end 324a. For example, the first leg 310 is welded to the body 308 and the first brace 322, and the second leg 312 is welded to the body 308 and the second brace 324. However, in some examples, the first leg 310 and/or the second leg 312 attaches to the body 308 and the respective ones of the first brace 322 and the second brace 324 via removable fasteners (e.g., bolts, clamps, fasteners, etc.) to enable disassembly of the first guide system 304 after installation of the thrust reverser portion 120 and the pylon 108. The first brace 322 and the second brace 324 are removably coupled to (e.g., supported by) the pylon 108. In other words, the first leg 310, the second leg 312, the first brace 322, and the second brace 324 cannot move relative to the pylon 108 and/or the body 308.

The second guide system 306 is removably coupled to the thrust reverser portion 120 (e.g., a second aircraft structure), which includes or supports the second hinge components 206. The second guide system 306 includes a first guide 330 and a second guide 332. The first guide 330 includes a first base 334 and a first arm 336. The first base 334 includes a flange 334a that form a recess (e.g., a U-shaped opening). The first arm 336 projects from or extends in a direction away from the first base 334. For example, the first arm 336 is cantilevered from the first base 334. Additionally, the first arm 336 and the first base 334 form a first arm angle 336c. The first arm 336 includes a first arm end 336a that couples (e.g., is fixed) to the first base 334 and a second arm end 336b spaced from the from the first arm end 336a. The second arm end 336b is configured to engage the second leg end 310b of the first leg 310. Specifically, the second arm end 336b includes a first arm connector 340 that interfaces (e.g., engages or couples) with the first leg connector 318. The first arm connector 340 and the first leg connector 318 of the illustrated example provides a connection that enables the first arm 336 to pivot about the first leg 310. Although the first arm 336 can pivot about to the first leg 310, the first arm 336 is a rigid beam that is fixed to the first base 334. In this example, the first arm connector 340 has a hook shape and the first leg connector 318 is a protrusion or structure configured to receive the hook. In other examples, the first leg connector 318 and the first arm connector 340 can form a ball-and-socket connection and/or any other connection that enables the first arm 336 to pivot about the first leg connector 318 at an interface provided by the second leg connector 320 and the second arm connector 346.

The second guide 332 includes a second base 342 and a second arm 344. The second base 342 includes a second flange 342a that forms a recess (e.g., a U-shaped opening). The second arm 344 projects from or extends in a direction away from the second base 342. For example, the second arm 344 is cantilevered from the second base 342. Additionally, the second arm 344 and the second base 342 form a second arm angle 344c. The second arm 344 includes a third arm end 344a that couples (e.g., is fixed) to the second base 342 and a fourth arm end 344b spaced from the third arm end 344a. The fourth arm end 344b includes a second arm connector 346 that interfaces (e.g., engages or couples) with the second leg connector 320. The second arm connector 346 and the second leg connector 320 of the illustrated example provides a connection that enables the second arm 344 to pivot about to the second leg 312. Although the second arm 344 can pivot about to the second leg 312, the second arm 344 is a rigid beam that is fixed to the second base 342. In this example, the second arm connector 346 has a hook shape and the second leg connector 320 is a protrusion or structure configured to receive the hook. In other examples, the second leg connector 320 and the second arm connector 346 can form a ball-and-socket connection and/or any other connection that enables the second arm 344 to pivot about to the second leg 312 at an interface provided by the second leg connector 320 and the second arm connector 346.

The first guide system 304 and/or the second guide system 306 can be configured to accommodate thrust reversers and/or pylons having different sizes or configurations. For example, the first arm 336 has a substantially planar shape (e.g. a straight) between the first arm end 336a and the second arm end 336b. In contrast, the second arm 344 of the illustrated example includes a first arm portion 344d and a second arm portion 344e that is angled relative to the first arm portion 344d between the third arm end 344a and the fourth arm end 344b. Additionally, the first arm angle 336c is different than the second arm angle 344c. However, in some examples, the first arm 336 and the second arm 344 can be identical. In other examples, the first guide system 304 and/or the second guide system 306 can be configured or structured in any other manner.

In operation, the first guide system 304 is removably attached to the pylon 108 and the second guide system 306 is removably attached to the thrust reverser portion 120. For example, the body 308 is attached the pylon 108, the first brace 322 is removably attached to the first one 314 of the first hinge components 204 and the second brace 324 is removably attached to the second one 316 of the first hinge components 204 (e.g., via, for example, fasteners). Likewise, the first arm 336 is removably attached to the thrust reverser portion 120 adjacent a first one 350 (e.g., a first portion) of the second hinge components 206 and the second arm 344 is removably attached to a second one 352 (e.g., a second portion) of the second hinge components 206. For example, the first base 334 removably attaches to a first beam 354 of the first thrust reverser portion 120 adjacent the first one 350 of the second hinge components 206 and the second base 342 removably attaches to a second beam 356 of the first thrust reverser portion 120 adjacent the second one 352 of the second hinge components 206. After the first guide system 304 is coupled to the pylon 108 and the second guide system 306 is coupled to the first thrust reverser portion 120, the first thrust reverser portion 120 is positioned adjacent the first guide system 304 (e.g., via a crane). The first thrust reverser portion 120 is positioned to couple the first arm connector 340 and the first leg connector 318 and the second arm connector 346 and the second leg connector 320. Engagement between first guide system 304 and the second guide system 306 enables alignment between the first hinge components 204 and the second hinge components 206.

Figure 4:
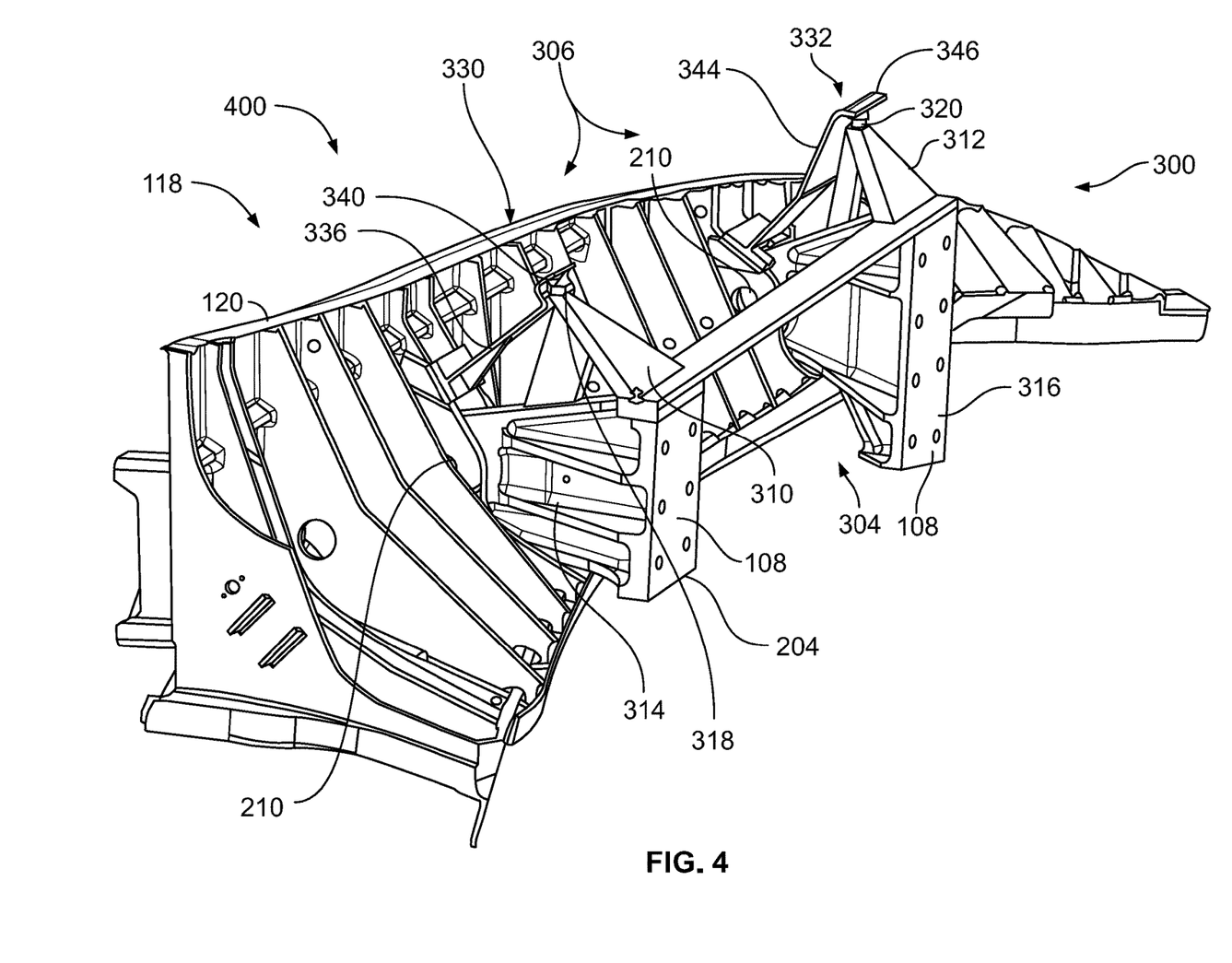
FIG. 4 is a perspective view of the example guide system of FIG. 3 shown in a second position.

FIG. 4 is a perspective view of the example guide system 300 of FIG. 3 shown in a second position 400 (e.g., an installed position or angle). In the second position 400, the guide system 300 aligns the hinge openings 208 (FIG. 3) of the first hinge components 204 with respective ones of the hinge openings 210 of the second hinge components 206. Referring to FIGS. 3 and 4, the guide system 300 aligns the first hinge components 204 and the second hinge components 206 when the thrust reverser portion 120 is rotated (e.g., clockwise in the orientation of FIGS. 3 and 4) to an installation angle relative to the pylon 108. Specifically, engagement between the first leg connector 318 and the first arm connector 340, and engagement between the second leg connector 320 and the second arm connector 346 guide pivotal movement of the thrust reverser portion 120 between the first position 302 and the second position 400. In the second position 400, the hinge openings 208 align with the hinge openings 210 to receive the hinge pins 212. Additionally, the first guide system 304 supports a load of the thrust reverser portion 120 to prevent the thrust reverser portion 120 from swaying or shifting when the hinge pins 212 are coupled through the hinge openings 208, 210.

Figure 5:
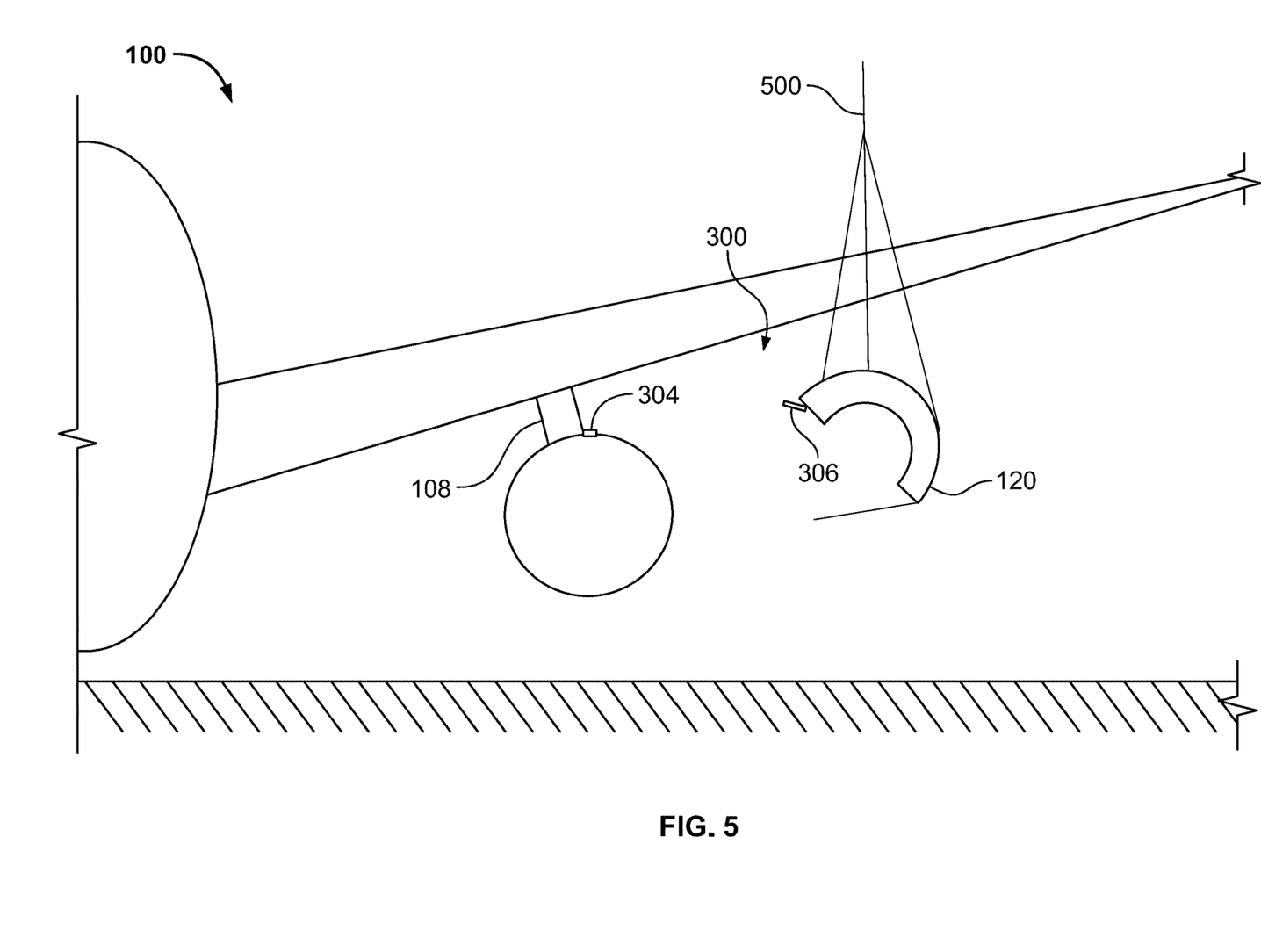
FIGS. 5-8 illustrate partial, front schematic views of the example aircraft of FIG. 1 undergoing assembly of a thrust reverser portion and a pylon via the example guide system of FIGS. 3 and 4.

FIGS. 5-8 are schematic illustrations depicting coupling of the thrust reverser portion 120 and the pylon 108 using the guide system 300 of FIGS. 3 and 4. FIG. 5 is a partial, front schematic illustration of the aircraft 100 of FIG. 1. During assembly of the aircraft 100, the first guide system 304 is attached to the pylon 108 as shown, for example in FIG. 3. For example, referring to FIG. 3, the body 308 is attached to the pylon 108 (e.g., via fasteners), the first brace 322 is attached to the first one 314 of the first hinge components 204 (e.g., via fasteners), and the second brace 324 is attached to the second one 316 of the first hinge components 204 (e.g., via fasteners). Likewise, the second guide system 306 is attached to the thrust reverser portion 120 as shown, for example, in FIG. 3. For example, the first arm 336 is attached to the second beam 356 of the thrust reverser portion 120 (e.g., via fasteners) and the second arm 344 is attached to the second beam 356 (e.g., via fasteners). The first arm 336 and the second arm 344 are fixed to the thrust reverser portion 120. After the guide system 300 is installed, the thrust reverser portion 120 is moved toward the pylon 108 via a crane 500 (e.g., an overhead crane).

Figure 6:
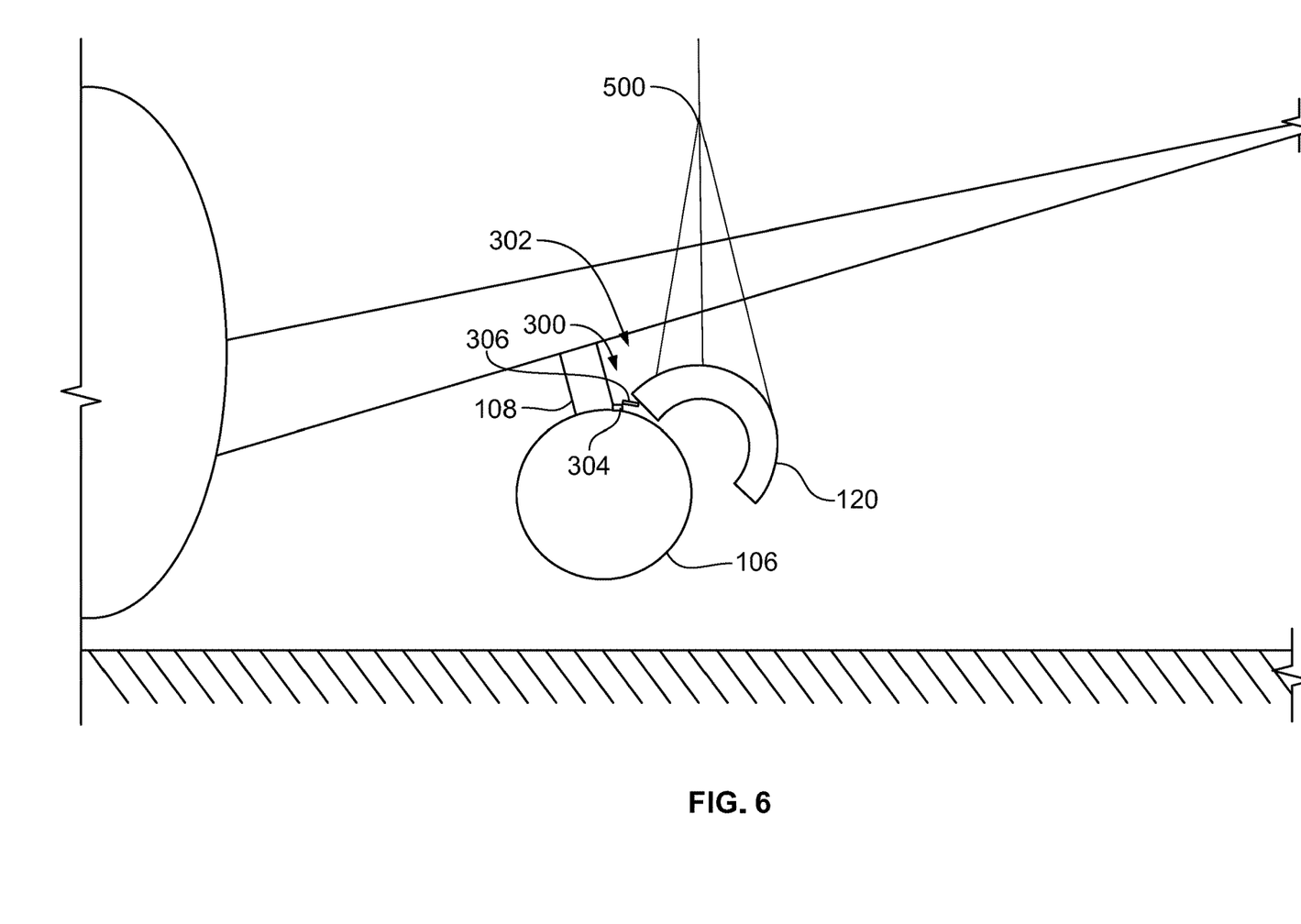

FIG. 6 is a schematic illustration of the aircraft 100 of FIG. 5 showing the guide system 300 in the first position 302 of FIG. 3. For example, the crane 500 moves the thrust reverser portion 120 adjacent the pylon 108 to couple the thrust reverser portion 120 to the aircraft engine 106. The crane 500 moves (e.g., lowers) the thrust reverser portion 120 to couple the first guide system 304 and the second guide system 306. For example, the crane 500 can be used to maneuver the thrust reverser portion 120 to enable the first arm connector 340 (FIG. 3) to couple to the first leg connector 318 and the second arm connector 346 to couple to the second leg connector 320.

Figure 7:
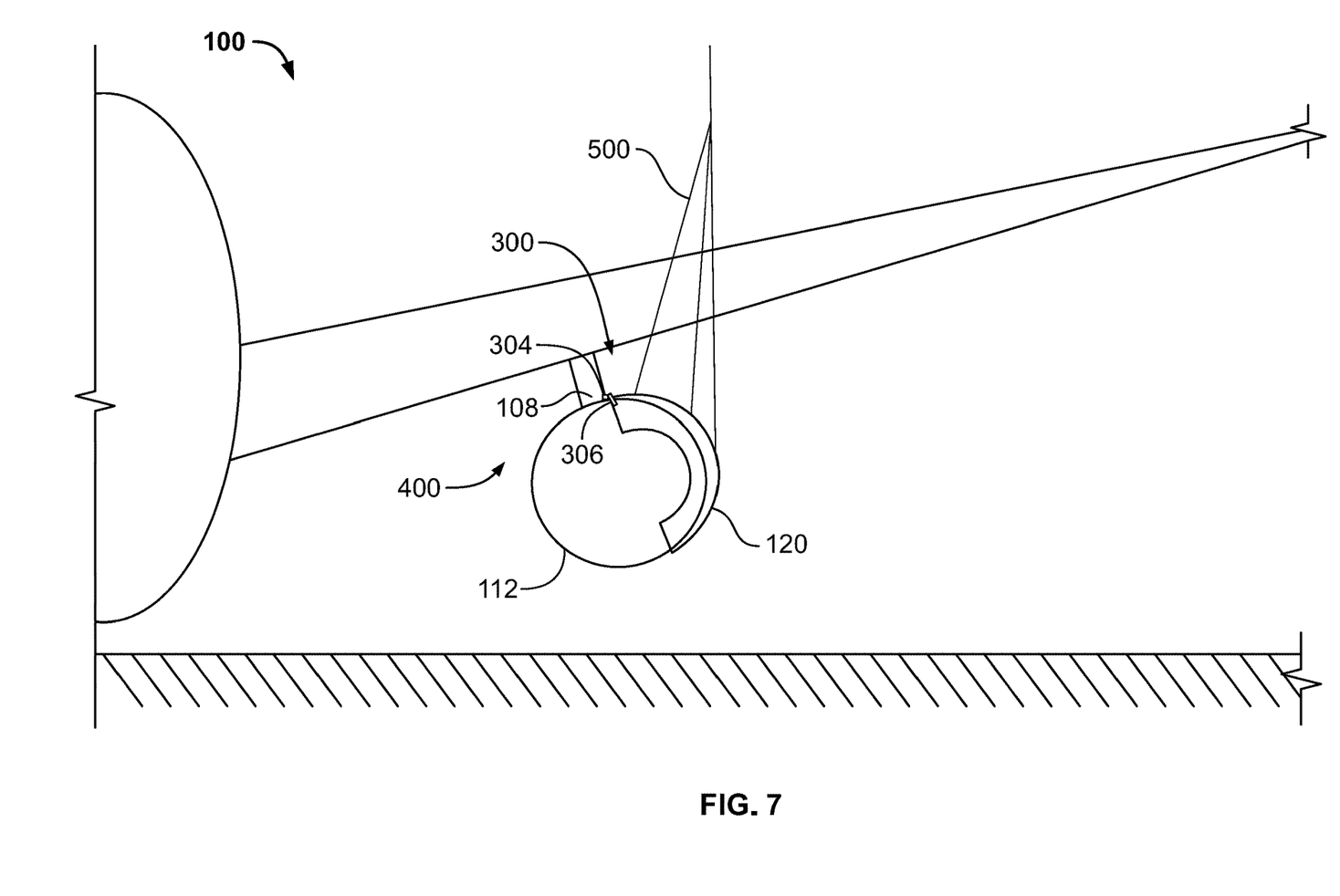

FIG. 7 is a schematic illustration of the aircraft 100 of FIG. 5 showing the guide system 300 in the second position 400 of FIG. 4. The thrust reverser portion 120 is moved via the crane 500 from the position of FIGS. 3 and 6 to the second position 400 of FIGS. 4 and 7. As the thrust reverser portion 120 is rotated by the crane from the first position of FIGS. 3 and 6 to the second position 400 of FIGS. 4 and 7, the first arm 336 pivots relative to the first leg 310 via the first arm connector 340 and the first leg connector 318, and the second arm 344 pivots relative to the second leg 312 via the second arm connector 346 and the second leg connector 320. As the first arm 336 and the second arm 344 pivot about the respective first leg 310 and the second leg 312, the guide system 300 guides the second hinge components 206 of the thrust reverser portion 120 into engagement and/or alignment with to the first hinge components 204 of the pylon 108. In other words, the guide system 300 aligns the hinge openings 210 and the hinge openings 208. Additionally, the guide system 300 maintains a position of the thrust reverser portion 120 fixed relative to the pylon 108 when the thrust reverser portion 120 is coupled to the crane 500. For example, when the second guide system 306 is coupled to the first guide system 304, the first guide system 304 stabilizes the thrust reverser portion 120 to prevent or restrict swaying or shifting (e.g. side-to-side movement) of the thrust reverser portion 120 that is supported by the crane 500. In on other words, the guide system 300 prevents or restricts the thrust reverser portion 120 from swinging, moving, or shifting (e.g., swaying or rocking) relative to the pylon 108 when the guide system 300 in the second position 400. Thus, the hinge pins 212 can be coupled to the hinge openings 208 and the hinge openings 210 with the thrust reverser portion 120 fixed (e.g., in the fore-aft direction or side-to-side movement) relative to the pylon 108. Thus, the guide system 300 reduces or prevents the thrust reverser portion 120 from swaying or rocking (e.g., sideways, back-and-forth, etc.) when the hinge pins 212 are inserted into the hinge openings 208 and 210. After the hinge pins 212 have been installed, the guide system 300 is removed from the thrust reverser portion 120 and the pylon 108.

Figure 8:
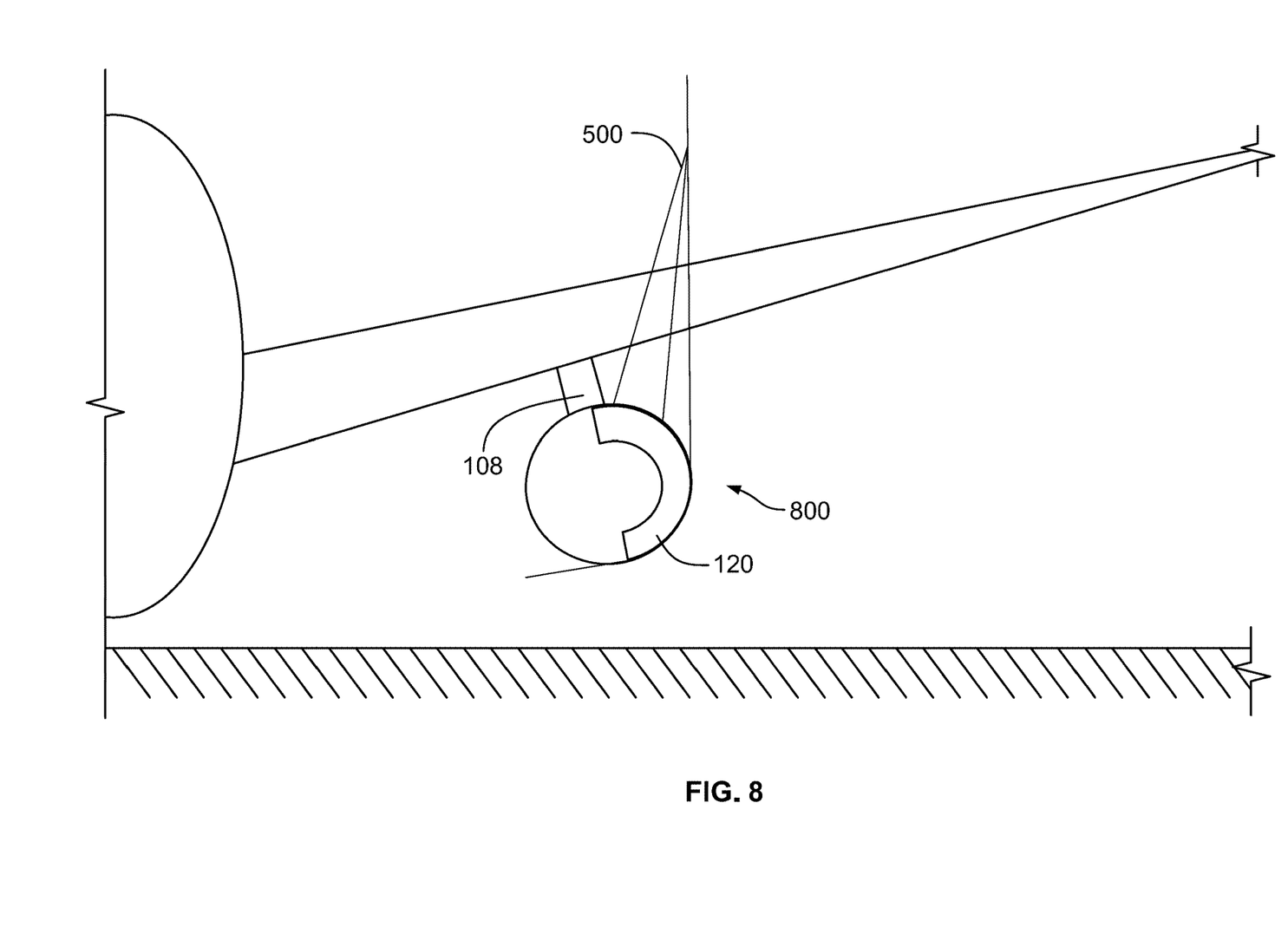

FIG. 8 is a schematic illustration of the aircraft 100 of FIGS. 5-7 showing the thrust reverser portion 120 in an installed position 800. After the hinge pins 212 are installed, the thrust reverser portion 120 is rotated about the hinge pins 212 via the crane 500 to the installed position 800. The installed position 800 is representative of an installation angle or position of the thrust reverser portion 120 relative to the aircraft engine 106. The crane 500 is then decoupled from the thrust reverser portion 120. Although the guide system 300 was removed from the thrust reverser portion 120 and the pylon 108 prior to the moving the thrust reverser portion 120 to the installed position 800, in some examples, the guide system 300 can be removed from the thrust reverser portion 120 and/or the pylon 108 after the thrust reverser portion 120 is moved to the installed position 800.

Figure 9A:
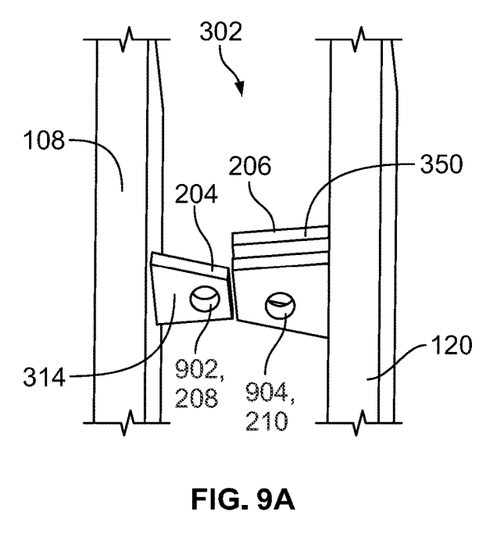
FIGS. 9A-9D illustrate various installation positions of an example hinge defined by an example pylon and a thrust reverser portion of the example aircraft engine.
Figure 9B:
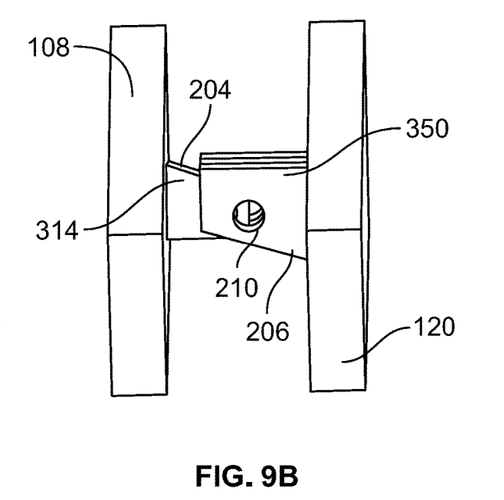
Figure 9C:
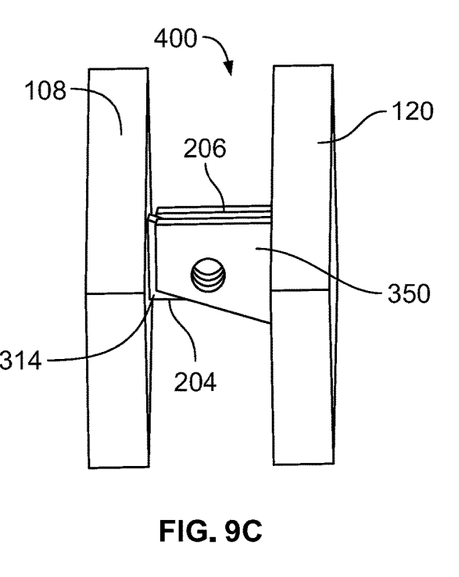
Figure 9D:
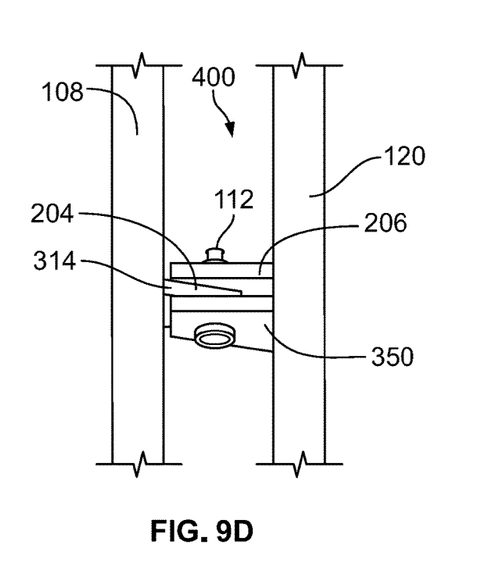

FIGS. 9A-9D are partial, sectional views of the thrust reverser portion 120 relative to the pylon 108 as the guide system 300 moves between the first position 302 and the second position 400. FIG. 9A illustrates the thrust reverser portion 120 relative to the pylon 108 when the guide system 300 is in the first position 302 of FIG. 3. As shown in FIG. 9A, the first one 350 of the second hinge components 206 of the thrust reverser portion 120 is aligned, but spaced apart from, the first one 314 of the first hinge components 204 of the pylon 108. The guide system 300 facilitates alignment between a first one 902 of the hinge openings 208 and a second one 904 of the hinge openings 210. FIG. 9B illustrates the thrust reverser portion 120 relative to the pylon 108 when the guide system 300 is between the first position 302 and the second position 400. FIG. 9C illustrates the guide system 300 in the second position 400. In the second position, the first one 314 of the first hinge components 204 is aligned with the first one 350 of the second hinge components 206 such that the first one 902 of the hinge openings 208 is aligned with the second one 904 of the hinge openings 210. The guide system 300 prevents swaying or movement (e.g., side-to-side movement) of the first one 350 of the second hinge components 206 relative to the first one 314 of the first hinge components 204 when the first arm 336 and the second arm 344 are in engagement with the first leg 310 and the second leg 312. FIG. 9D illustrates the hinge pin 212 coupled to the first one 902 of the hinge opening 208 and the second one 904 of the hinge opening 210 to pivotally couple the thrust reverser portion 120 and the pylon 108.

Figure 10:
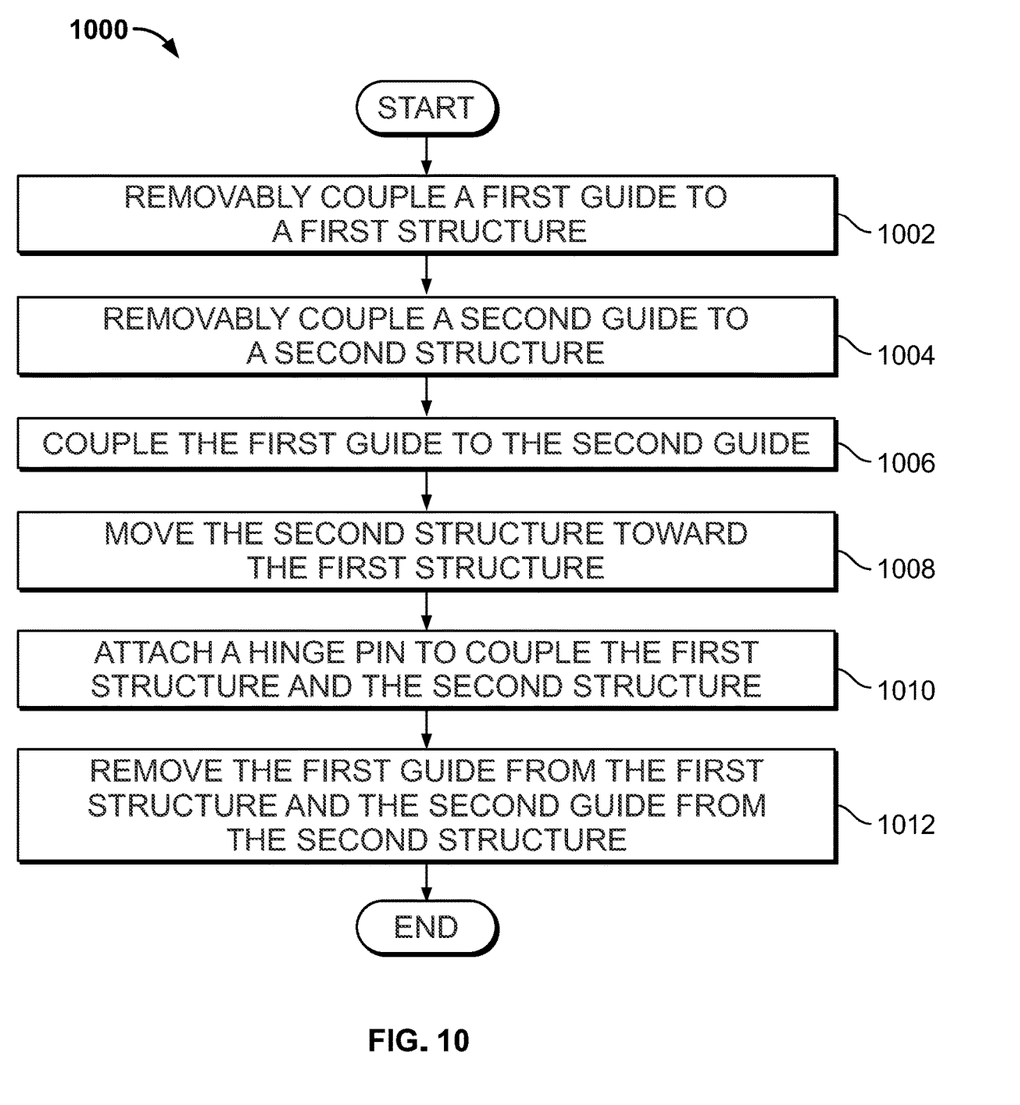
FIG. 10 is a flowchart illustrating an example method to assemble a first structure and a second structure using the example guide system of FIGS. 3 and 4.

FIG. 10 depicts an example flowchart representative of an example method 1000 to assemble structures of an aircraft using the example guide system 300 of FIG. 3. In some examples, the blocks can be re-arranged or removed, or additional blocks can be added. The method begins by removably coupling a first guide system 304 to a first structure (block 1002). For example, the first guide system 304 can be removably coupled (e.g., removably fastened via fasteners) to the pylon 108. A second guide system 306 is removably coupled to a second structure (block 1004). For example, the second guide system 306 is removably coupled (e.g., removably fastened via fasteners) to the thrust reverser portion 120.

After the first guide system 304 and the second guide system 306 are coupled to the respective first and second structures, the second guide system 306 is coupled to the first guide system 304 (block 1006). For example, the first arm 336 of the second guide system 306 aligns (e.g., couples to or attaches) with the first leg 310 of the first guide system 304 and the second arm 344 of the second guide system 306 aligns (e.g., couples to or attaches) with the second leg 312 of the first guide system 304. Additionally, the first arm 336 is pivotally attached to the first leg 310 via the first arm connector 340 and the first leg connector 318, and the second arm 344 is pivotally attached to the second leg 312 via the second arm connector 346 and the second leg connector 320.

The second structure is then moved relative to the first structure to align hinge openings of the respective first and second structures (block 1008). For example, the thrust reverser portion 120 is pivoted relative to the pylon 108 such that the first arm 336 pivots relative to the first leg 310 and the second arm 344 pivots about the second leg 312 to align the hinge openings 208 of the pylon 108 with the hinge openings 210 of the thrust reverser portion 120.

A hinge pin is attached to the respective hinge openings of the first structure and the second structure (1010). For example, respective pairs of the hinge openings 208 and 210 in alignment receives the hinge pin 212 to couple the thrust reverser portion 120 and the pylon 108.

After the hinge pins 212 are installed, the first guide system 304 is removed from the first structure and the second guide system 306 is removed from the second structure (block 1012). In some examples, the thrust reverser portion 120 can be moved to the installed position 800.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

At least some of the aforementioned examples include one or more features and/or benefits including, but not limited to, the following:

In some examples, an apparatus includes a first guide system structured to removably couple to a first aircraft structure having a first hinge component. A second guide system is structured to removably couple to a second aircraft structure having a second hinge component. The first guide system is to engage the second guide system to enable alignment between the first hinge component and the second hinge component during assembly of the first aircraft structure and the second aircraft structure.

In some examples, the first aircraft structure is a pylon and the second aircraft structure is a thrust reverser section.

In some examples, the first guide system includes a body, a first leg and a second leg, the first leg being spaced from the second leg.

In some examples, the first leg and the second leg are fixed to the body.

In some examples, the first guide system includes a first brace to support the first leg and a second brace to support the second leg.

In some examples, the first brace is coupled to the first leg and projects in a direction away from the first leg, and wherein the second brace is coupled to the second leg and projects in a direction away from the second leg.

In some examples, the second guide includes a first base and a first arm, the first arm projecting from the first base.

In some examples, the second guide includes a second base and a second arm, the second arm projecting from the second base.

In some examples, the first arm includes a first arm connector and the first leg includes a first leg connector, the first arm connector to engage the first leg connector.

In some examples, the second arm includes a second arm connector and the second leg includes a second leg connector, the second arm connector to engage the second leg connector.

In some examples, the first arm connector and the first leg connector enable the first arm to pivot about the first leg when the second guide moves relative to the first guide system.

In some examples, the second arm connector and the second leg connector enable the second arm to pivot about the second leg when the second guide moves relative to the first guide system.

In some examples, an apparatus includes a first guide removably attachable to a first hinge component and a second hinge component of a pylon of an aircraft engine, a second guide removably attachable to a third hinge component of a thrust reverser of the aircraft engine; and a third guide removably attachable to a fourth hinge component of the thrust reverser. The second guide is spaced from the third guide. The second guide to engage the first guide to align the first hinge component and the third hinge component, and the third guide to engage the first guide to align the second hinge component and the fourth hinge component when installing the thrust reverser to the pylon.

In some examples, the first guide includes a body, a first leg and a second leg, the first leg and the second leg projecting from the body.

In some examples, the first leg is spaced from the second leg by a distance defined by a longitudinal length of the body.

In some examples, the first guide is removably fastened to the pylon.

In some examples, the second guide includes a first base and a first arm extending from the first base, and wherein the third guide includes a second base and a second arm extending from the second base.

In some examples, the second guide is removably fastened to a first portion of the thrust reverser and the third guide is removably fastened to a second portion of the thrust reverser.

In some examples, a method includes: removably coupling a first guide to a first structure; removably coupling a second guide to a second structure; coupling the first guide and the second guide; moving the second structure toward the first structure; attaching a hinge pin to the couple the first structure and the second structure; and removing the first guide from the first structure and the second guide from the second structure.

In some examples, the moving of the second structure toward the first structure includes pivoting the second guide about to the first guide from a first position to a second position.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

What is claimed is:

1. An apparatus comprising:
a first guide system structured to removably couple to a first aircraft structure having a first hinge component, the first guide system includes a body, a first leg and a second leg, the first leg spaced from the second leg, the first guide system includes a first brace to support the first leg and a second brace to support the second leg; and
a second guide system structured to removably couple to a second aircraft structure having a second hinge component, the first guide system to engage the second guide system to enable alignment and coupling of the first hinge component and the second hinge component during assembly of the first aircraft structure and the second aircraft structure, the first guide system structured to decouple from the first aircraft structure and the second guide system structured to decouple from the second aircraft structure when the first hinge component is coupled to the second hinge component.

2. An apparatus comprising:
a first guide system structured to removably couple to a first aircraft structure having a first hinge component, the first aircraft structure is a pylon; and
a second guide system structured to removably couple to a second aircraft structure having a second hinge component, and the second aircraft structure is a thrust reverser section, the first guide system to engage the second guide system to enable alignment and coupling of the first hinge component and the second hinge component during assembly of the first aircraft structure and the second aircraft structure, the first guide system structured to decouple from the first aircraft structure and the second guide system structured to decouple from the second aircraft structure when the first hinge component is coupled to the second hinge component.

3. The apparatus of claim 2, wherein the first guide system includes a body, a first leg and a second leg, the first leg being spaced from the second leg.

4. The apparatus of claim 3, wherein the first leg and the second leg are fixed to the body.

5. The apparatus of claim 3, wherein the first guide system includes a first brace to support the first leg and a second brace to support the second leg.

6. The apparatus of claim 5, wherein the first brace is coupled to the first leg and projects in a direction away from the first leg, and wherein the second brace is coupled to the second leg and projects in a direction away from the second leg.

7. The apparatus of claim 3, wherein the second guide system includes a first base and a first arm, the first arm projecting from the first base.

8. An apparatus comprising:
a first guide system structured to removably couple to a first aircraft structure having a first hinge component, the first guide system includes a body, a first leg and a second leg, the first leg being spaced from the second leg; and
a second guide system structured to removably couple to a second aircraft structure having a second hinge component, the second guide system including a first base and a first arm, the first arm projecting from the first base, the second guide system including a second base and a second arm, the second arm projecting from the second base, the first guide system to engage the second guide system to enable alignment and coupling of the first hinge component and the second hinge component during assembly of the first aircraft structure and the second aircraft structure, the first guide system structured to decouple from the first aircraft structure and the second guide system structured to decouple from the second aircraft structure when the first hinge component is coupled to the second hinge component.

9. The apparatus of claim 8, wherein the first arm includes a first arm connector and the first leg includes a first leg connector, the first arm connector to engage the first leg connector to provide a pivot to allow for alignment of the first hinge component and the second hinge component.

10. The apparatus of claim 9, wherein the second arm includes a second arm connector and the second leg includes a second leg connector, the second arm connector to engage the second leg connector to provide a pivot to allow for alignment of the first hinge component and the second hinge component.

11. The apparatus of claim 10, wherein the first arm connector and the first leg connector enable the first arm to pivot about the first leg when the second guide system moves relative to the first guide system.

12. The apparatus of claim 11, wherein the second arm connector and the second leg connector enable the second arm to pivot about the second leg when the second guide system moves relative to the first guide system.

13. An apparatus comprising:
a first guide removably attachable to a first hinge component and a second hinge component of a pylon of an aircraft engine;
a second guide removably attachable to a third hinge component of a thrust reverser of the aircraft engine; and
a third guide removably attachable to a fourth hinge component of the thrust reverser, the second guide being spaced from the third guide, the second guide to engage the first guide to enable alignment and coupling of the first hinge component and the third hinge component, and the third guide to engage the first guide to enable alignment and coupling of the second hinge component and the fourth hinge component when installing the thrust reverser to the pylon, the first guide structured to decouple from the first hinge component and the second hinge component, the second guide structured to decouple from the third hinge component, and the third guide structured to decouple from the fourth hinge component when the first hinge component is attached to the third hinge component and the second hinge component is attached to the fourth hinge component.

14. The apparatus of claim 13, wherein the first guide includes a body, a first leg and a second leg, the first leg and the second leg projecting from the body.

15. The apparatus of claim 14, wherein the first leg is spaced from the second leg by a distance defined by a longitudinal length of the body.

16. The apparatus of claim 13, wherein the first guide is removably fastened to the pylon.

17. The apparatus of claim 13, wherein the second guide includes a first base and a first arm extending from the first base, and wherein the third guide includes a second base and a second arm extending from the second base.

18. The apparatus of claim 13, wherein the second guide is removably fastened to a first portion of the thrust reverser and the third guide is removably fastened to a second portion of the thrust reverser.

19. A method comprising:
removably coupling a first guide system to a first aircraft structure having a first hinge component, the first aircraft structure is a pylon;
removably coupling a second guide system to a second aircraft structure having a second hinge component, the second aircraft structure is a thrust reverser section;
coupling the first guide system and the second guide system;
moving the second aircraft structure toward the first aircraft structure via the first guide system and the second guide system to align the first hinge component and the second hinge component during assembly of the first aircraft structure and the second aircraft structure;
attaching a hinge pin to the aligned first and second hinge components to couple the first aircraft structure and the second aircraft structure; and
removing the first guide system from the first aircraft structure and the second guide system from the second aircraft structure when the first hinge component is coupled to the second hinge component.

20. The method of claim 19, wherein the moving of the second aircraft structure toward the first aircraft structure includes pivoting the second guide system about to the first guide system from a first position to a second position.

21. The apparatus of claim 7, wherein the first arm includes a first arm connector and the first leg includes a first leg connector, the first arm connector to engage the first leg connector to provide a pivot to allow for alignment of the first hinge component and the second hinge component, the first arm connector and the first leg connector enable the first arm to pivot about the first leg when the second guide system moves relative to the first guide system.

22. The apparatus of claim 21, wherein the second guide system includes a second base and a second arm, the second arm projecting from the second base.

23. The apparatus of claim 22, wherein the second arm includes a second arm connector and the second leg includes a second leg connector, the second arm connector to engage the second leg connector to provide a pivot to allow for alignment of the first hinge component and the second hinge component, the second arm connector and the second leg connector enable the second arm to pivot about the second leg when the second guide system moves relative to the first guide system.

24. The apparatus of claim 12, wherein the first guide system includes a first brace to support the first leg and a second brace to support the second leg, the first brace coupled to the first leg and projects in a direction away from the first leg, and the second brace coupled to the second leg and projects in a direction away from the second leg.

* * * * *